US012752839B2

(12) United States Patent
Carmestedt

(10) Patent No.: US 12,752,839 B2
(45) Date of Patent: Oct. 6, 2026

(54) AUXILIARY PUMP ARRANGEMENT AND A POWER STEERING SYSTEM COMPRISING SUCH AUXILIARY PUMP ARRANGEMENT

(71) Applicant: VOLVO TRUCK CORPORATION, Gothenburg (SE)

(72) Inventor: Anders Carmestedt, Sätila (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 756 days.

(21) Appl. No.: 18/308,144

(22) Filed: Apr. 27, 2023

(65) Prior Publication Data

US 2023/0356772 A1 Nov. 9, 2023

(30) Foreign Application Priority Data

May 6, 2022 (EP) .................................... 22171961

(51) Int. Cl.
*B62D 5/06* (2006.01)

(52) U.S. Cl.
CPC .................................... *B62D 5/063* (2013.01)

(58) Field of Classification Search
CPC ......... F16H 61/0031; B62D 5/07; B62D 5/30; B62D 5/063
See application file for complete search history.

(56) References Cited

U.S. PATENT DOCUMENTS 3,407,894 A 10/1968 Thompson et al.
3,613,818 A * 10/1971 Schubert ................. F15B 11/17 180/406
3,747,725 A 7/1973 Feustel et al.
3,762,492 A * 10/1973 Ron ...................... B60T 13/162 200/81.9 R
3,800,900 A * 4/1974 Goodale ............. F16H 61/0031 180/406
3,958,657 A 5/1976 McBurnett
4,013,138 A 3/1977 McBurnett
4,015,681 A 4/1977 Shore et al.
7,510,044 B2 * 3/2009 Williams ............... B62D 5/063 180/405

(Continued)

FOREIGN PATENT DOCUMENTS

EP 3078571 A1 * 10/2016 ............. B62D 5/093
WO 2018194500 A1 10/2018

OTHER PUBLICATIONS

Extended European Search Report in corresponding European Application No. 22171961.0 dated Oct. 20, 2022 (10 pages).

*Primary Examiner* — James A English
(74) *Attorney, Agent, or Firm* — Jeffri A. Kaminski; Venable LLP

(57) ABSTRACT

An auxiliary pump arrangement includes an auxiliary pump having a pump inlet configured to receive a flow of hydraulic fluid from a primary power steering pump via a hydraulic supply conduit, and a pump outlet. An actuator is connected to the auxiliary pump, the actuator comprising a clutch connectable to a driveline of the vehicle; wherein the auxiliary pump arrangement is configured to assume an engaged state in which the clutch connects the auxiliary pump to a driveline when a first pressure exceeds a second pressure, and a disengaged state in which the clutch disconnects the auxiliary pump from the driveline when the second pressure exceeds the first pressure.

13 Claims, 4 Drawing Sheets

(56) References Cited

U.S. PATENT DOCUMENTS

| | | | | |
|---|---|---|---|---|
| 10,611,401 | B2 * | 4/2020 | StHilaire ................ | B62D 5/065 |
| 2020/0062302 | A1 | 2/2020 | Roos et al. | |
| 2020/0324810 | A1 * | 10/2020 | Meid ....................... | B60T 13/16 |
| 2022/0135122 | A1 | 5/2022 | Schacht et al. | |

* cited by examiner

AUXILIARY PUMP ARRANGEMENT AND A POWER STEERING SYSTEM COMPRISING SUCH AUXILIARY PUMP ARRANGEMENT

TECHNICAL FIELD

The present invention relates to an auxiliary pump arrangement for a power steering system of a vehicle. The invention also relates to a power steering system comprising such an auxiliary pump arrangement. Although the invention will mainly be directed to a vehicle in the form of a truck, the invention may also be applicable for other types of vehicles using a power steering system provided with a hydraulically operated primary power steering pump, such as e.g., buses, working machines, and other transportation vehicles.

BACKGROUND

Steering systems of various types are available on the market and applied in vehicles. A conventional steering system is a hydraulic power steering system in which a hydraulic pump is used for increasing the steering wheel input to the steered wheels of the vehicle. In detail, the hydraulic pump is driven by the rotation from the vehicle's engine to pump the flow of hydraulic to increase the steering wheel input.

The use of hydraulic power steering system is especially applicable for vehicle using double front steered wheel axles, since the effort to apply sufficient steering power to such type of vehicle is too excessive.

To have a secure system that can provide the desired hydraulic power in case the primary hydraulic pump malfunctions, an additional hydraulic pump can be used. US 2002/0062302 presents a solution in which a primary pump is driven by an internal combustion engine, and a secondary pump is driven by an electric motor or driven from the vehicle transmission. The second pump can be inactivated by e.g. shutting down the electric motor or disconnecting it mechanically with a clutch.

Although US 2002/0062302 presents a solution in which a secondary, backup pump is available if the primary pump in some way malfunctions or in any other way is unable to generate a sufficient flow of hydraulic pressure, the steering system presented in US 2002/0062302 is still in need of further improvements. In particular, it is a desire to provide an auxiliary pump arrangement which is less power consuming while still being available as a reliable backup pump when needed.

SUMMARY

It is thus an object of the present invention to at least partially overcome the above described deficiencies.

According to a first aspect, there is provided an auxiliary pump arrangement for providing a flow of hydraulic fluid to a power steering system of a vehicle, the auxiliary pump arrangement comprising an auxiliary pump having a pump inlet configured to receive a flow of hydraulic fluid from a primary power steering pump via a hydraulic supply conduit, and a pump outlet; an actuator connected to the auxiliary pump, the actuator comprising a clutch connectable to a driveline of the vehicle; a biasing member operable to exert a first pressure on the clutch for urging the clutch towards the driveline; and a chamber accommodating a piston member of the actuator, the piston member dividing the chamber into a first compartment and a second compartment, wherein the first compartment is configured to receive at least a portion of the flow of hydraulic fluid from the hydraulic circuit for exerting a second pressure on the piston member to urge the clutch away from the driveline; wherein the auxiliary pump arrangement is configured to assume an engaged state in which the clutch connects the auxiliary pump to the driveline when the first pressure exceeds the second pressure, and a disengaged state in which the clutch disconnects the auxiliary pump from the driveline when the second pressure exceeds the first pressure.

The driveline should be construed as any suitable rotating portion of the driveline, such as a portion of the transmission, or a wheel axle, etc. The rotation from the driveline is, when the clutch assumes the engaged state, operating the auxiliary pump to rotate and pump hydraulic fluid through the hydraulic supply conduit.

The biasing member should be construed a device exerting a pressure force, i.e. the first pressure, on the clutch. The force is thus acting on the clutch so as to urge the clutch towards the driveline for engaging with the driveline. However, the force resulting from the pressure of hydraulic fluid in the first compartment, i.e. the second pressure, strives at urging the clutch in the opposite direction, i.e. away from the driveline. The present invention is here based on the insight that by providing a clutch operable by the biasing member as defined above, the clutch will assume the engaged state when the second pressure falls below a predetermined threshold. In detail, when the force resulting from the second pressure falls below the force resulting from the first pressure, the clutch will assume the engages state, whereby the auxiliary pump will pump the flow of hydraulic fluid through the hydraulic supply conduit and increase the steering wheel input to the steered wheels of the vehicle. An advantage is thus that when the primary power steering pump fails to generate a sufficient hydraulic pressure through the hydraulic conduit, the clutch will automatically assume the engaged state and the hydraulic power is hereby instead generated by the auxiliary pump.

The auxiliary pump is thus, when the primary power steering pump operates and functions as intended, disconnected and at rest. The auxiliary pump arrangement of the present invention hereby reduces the fuel consumption in comparison to a solution in which a secondary pump is continuously arranged in the engaged state for being prepared for operation, while at the same time providing a safe function which does not require any active control function to initiate operation of an auxiliary backup pump.

According to an example embodiment, the auxiliary pump arrangement may comprise a controllable valve configured to assume a first state in which the controllable valve directs the flow of hydraulic fluid from the hydraulic supply conduit to the first compartment, and a second state in which the controllable valve directs the flow of hydraulic fluid from the hydraulic supply conduit to the second compartment. As described above, the auxiliary pump is preferably disconnected when the primary power steering pump functions as intended. Thus, and according to an example embodiment, the controllable valve may be pre-set to assume the first state and configured to assume the second state upon receipt of a control signal from the processing circuitry. Accordingly, the controllable valve, when not receiving a control signal, directs the hydraulic fluid to the first compartment.

According to an example embodiment, the controllable valve may comprise a spring, the spring being configured to force the controllable valve to assume the first state.

According to an example embodiment, the hydraulic fluid may assist the biasing member to urge the clutch towards the driveline when the controllable valve assumes the second state. Hereby, when there is a planned action of shutting down the primary power steering pump, the auxiliary pump can be prepared for a pumping action prior to shutting down the primary power steering pump, which will reduce the risk of an undesired pressure reduction in the power steering system.

According to an example embodiment, the auxiliary pump arrangement may further comprise a control unit, the control unit comprising processing circuitry coupled to the controllable valve, wherein the processing circuitry is configured to control the controllable valve to switch between the first and second states.

The processing circuitry may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with a steering control system of the vehicle.

According to an example embodiment, the first compartment may comprise a first outlet, the first outlet is arranged in fluid communication with the pump outlet of the auxiliary pump. According to an example embodiment, the auxiliary pump arrangement may comprise a first one-way valve in fluid communication between the first outlet and the pump outlet, the first one-way valve being configured to prevent hydraulic fluid from the pump outlet to reach the first outlet. The first one-way valve will prevent the flow from the pump outlet to reach the first compartment.

According to an example embodiment, the second compartment may comprise a second outlet, the second outlet is arranged in fluid communication with the pump outlet of the auxiliary pump. According to an example embodiment, the auxiliary pump arrangement may comprise a second one-way valve in fluid communication between the second outlet and the pump outlet, the second one-way valve being configured to prevent hydraulic fluid from the pump outlet to reach the second outlet. The second one-way valve will prevent the flow from the pump outlet to reach the second compartment.

According to an example embodiment, the auxiliary pump arrangement may further comprise a bypass conduit connected to the hydraulic supply conduit, the bypass conduit being configured to at least partly direct a flow of hydraulic fluid to bypass the auxiliary pump. An advantage is that a portion of the flow can be directed to bypass the auxiliary pump in cases when the hydraulic pressure from the primary power steering pump is above a predetermined threshold limit. Hereby, cavities in the auxiliary pump can be prevented, especially when the auxiliary pump arrangement assumes the disengaged state. According to an example embodiment, the bypass conduit may comprise a bypass one-way valve. Hereby, the bypass one-way valve opens when the pressure in the hydraulic supply conduit exceeds a predetermined threshold level. The bypass one-way valve prevents the hydraulic fluid to flow in the "wrong" direction.

According to a second aspect, there is provided a power steering system for a vehicle, the power steering system comprising a primary power steering pump operable by a prime mover of the vehicle, and an auxiliary pump arrangement according to any one of the embodiments described above in relation to the first aspect.

According to a third aspect, there is provided a vehicle comprising a power steering system according to the second aspect.

According to an example embodiment, the driveline may comprise an electric machine for propelling at least one pair of wheels of the vehicle.

Effects and features of the second and third aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
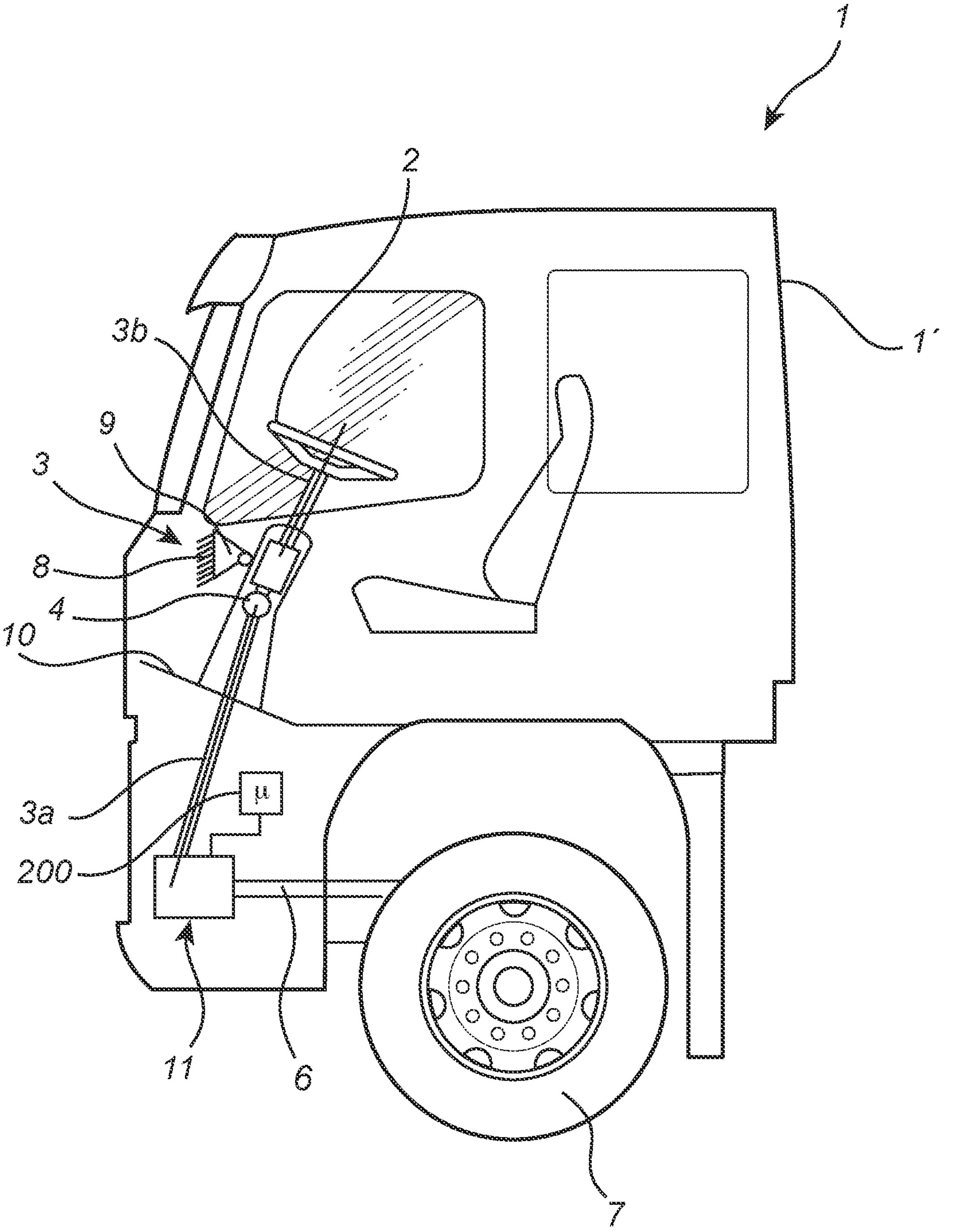
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

FIG. 1 is a side view of a vehicle 1 in the form of a truck. FIG. 1 particularly illustrates the cab 1' of the vehicle 1. The cab 1 comprises a steering wheel 2 for controlling steering operations of the vehicle 1. As exemplified in FIG. 1, the steering wheel 2 is connected to a steering main shaft 3 which comprises a first, upper steering shaft 3*b* and a second, lower steering shaft 3*a*. The steering main shaft 3 is schematically indicated and may optionally comprise additional components, such as one or more universal joints 4 if required. The steering main shaft 3 is connected to a steering gear which, via a steering linkage 6, can act on a pair of wheels 7 in order to steer the vehicle 1. The steering main shaft 3 can further extend in a support 8, the upper part of which is provided with an attachment 9 mounted on the cab or dashboard of the vehicle, and the lower part of which is fixed to the floor 10 of the cab. The vehicle 1 also comprises a power steering system 11, which will be described in further detail below with reference to FIGS. 2-4 for assisting a driver of the vehicle 1. The power steering system 11 is exemplified as connected to the steering linkage 6. The power steering system 11 may also be directly connected to the steered wheel axle(s) of the vehicle, although not explicitly depicted in FIG. 1. The vehicle 1 also comprises a control unit 200 connected to the power steering system 11, and preferably an electric machine for propelling the pair of wheels 7.

The control unit 200 comprises processing circuitry which may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with an upper layer vehicle control system (not shown) controlling various vehicle functionalities during operation of the vehicle.

The arrangement depicted in FIG. 1 should be construed as one of a plurality of conceivable steering arrangements, and the FIG. 1 example is used for illustrative purposes only. As an example, the steering system 11 may be positioned in the vicinity of the steering gear (not shown). Thus, the following disclosure is applicable for other types of arrangements as well, such as e.g. an autonomously controlled steering arrangement where the vehicle is not provided with the above described steering wheel 2.

Figure 2:
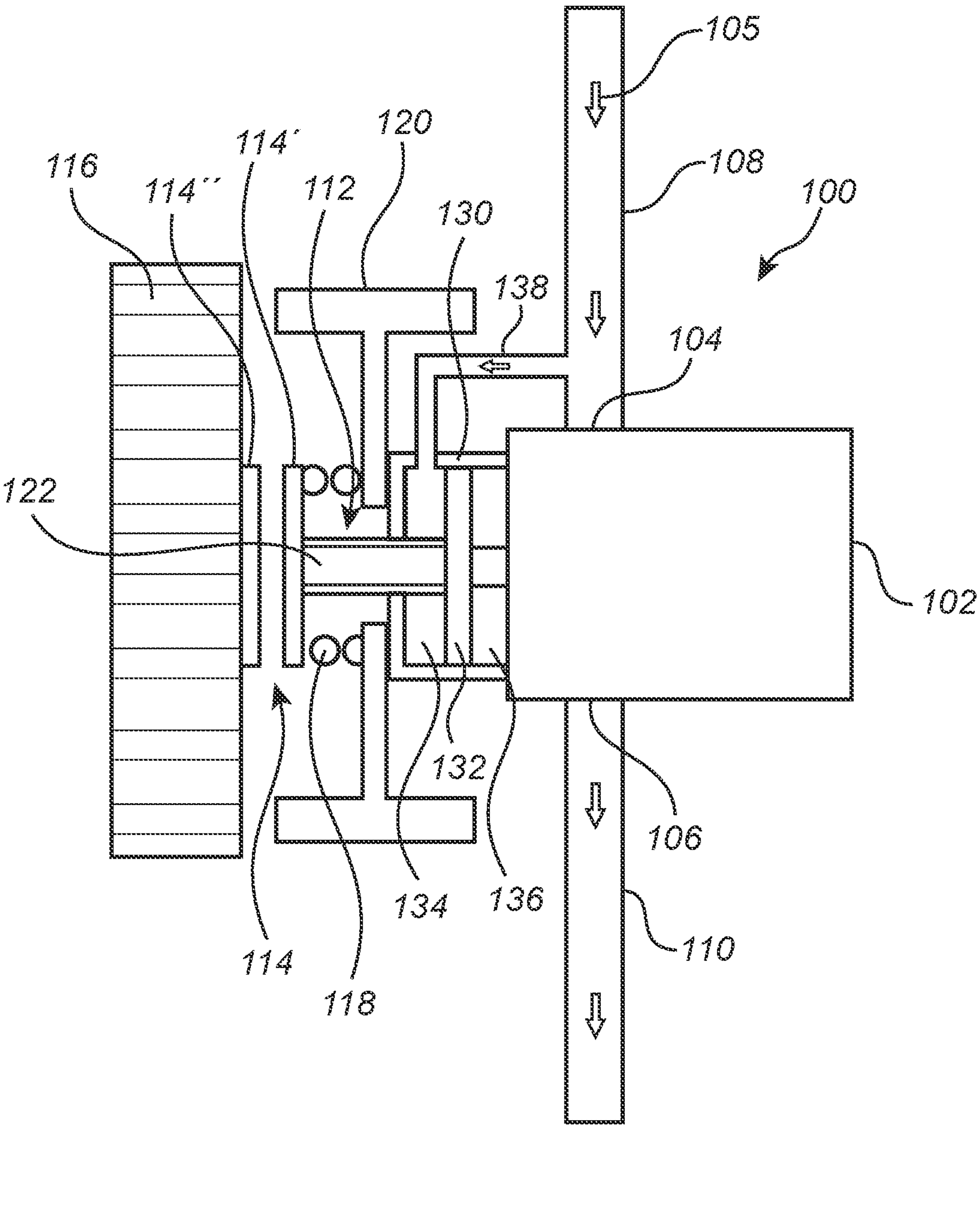
FIG. 2 is a schematic illustration of an auxiliary pump arrangement according to an example embodiment.

Turning to FIG. 2 which is a schematic illustration of an auxiliary pump arrangement 100 according to an example embodiment. The auxiliary pump arrangement 100 should be construed as being fluidly connected to the above described power steering system 11 and is thus arranged to provide a flow of hydraulic fluid to the power steering system 11 of the vehicle as a backup system in case of failure of the power steering system 11, or if additional power to the power steering system 11 is required/desired, as will be further described below. As depicted in FIG. 2, the auxiliary pump arrangement 100 comprises an auxiliary pump 102, preferably arranged in the form of a hydraulic pump. The auxiliary pump 102 comprises a pump inlet 104 receiving a flow of hydraulic fluid 105 from the power steering system 11, and a pump outlet 106 configured to feed a flow of pressurized hydraulic fluid back to the power steering system 11. The auxiliary pump arrangement 100 and the power steering system 11 are thus arranged in a closed loop through which hydraulic fluid is transported. As can be seen in FIG. 2, the pump inlet 104 is connected to a hydraulic supply conduit 108 for receiving the flow of hydraulic fluid 105, and the pump outlet 106 is connected to a pump outlet conduit 110 for feeding the flow of hydraulic fluid, pressurized by the auxiliary pump 102 towards the power steering system 11.

Moreover, the auxiliary pump arrangement 100 further comprises an actuator 112. The actuator 112 is connected to the auxiliary pump 102. In detail, the actuator 112 is connected to the auxiliary pump 102 at a first end thereof, and comprises a clutch 114, preferably a friction clutch, at a second end thereof. The clutch 114 is connectable to a portion of a driveline 116 of the vehicle 1. The portion of the driveline 116 may, for example, be a gear wheel connected to a transmission of the driveline 116 or a rotating shaft of the driveline. The portion of the driveline 116 should thus preferably be a rotating portion as will be evident from the below disclosure.

Furthermore, the auxiliary pump arrangement 100 comprises a biasing member 118, in FIG. 2 exemplified as a coil spring. The biasing member 118 is arranged between a first member 114' of the clutch 114 and a stationary member 120. The stationary member 120 may be a housing or a bracket fixedly connected to a portion of the vehicle 1, i.e. the stationary member is not movable relative to e.g. the auxiliary pump 102. The biasing member 118 is arranged to exert a first pressure generating a compression force on the first member 114' of the clutch 114 such that the first member 114' of the clutch 114 is urged towards a second member 114" of the clutch 114. The first member 114' of the clutch 114 is thus fixedly connected to an actuator arm 122 of the actuator 112 and the second member 114" of the clutch 114 is fixedly connected to the driveline 116 of the vehicle 1. When the first 114' and second 114" members of the clutch 114 engages, the actuator 112 rotates along with the rotation of the driveline 116, thereby rotating the auxiliary pump 102, which in turn pressurizes the hydraulic fluid 105 fed into the pump inlet 104.

As can be seen in FIG. 2, the auxiliary pump arrangement 100 also comprises a chamber 130 accommodating a piston 132. The piston 132 is dividing the chamber 130 into a first compartment 134 and a second compartment 136. The first compartment 134 is arranged in fluid communication with the hydraulic supply conduit 108. In particular, a chamber inlet conduit 138 is connected between the first compartment 134 and the hydraulic supply conduit 108, preferably at a position upstream the pump inlet 104. When hydraulic fluid 105 is provided into the first compartment 134 via the chamber inlet conduit 138, the hydraulic fluid exerts a second pressure on the piston 132 generating a compression force on the piston to urge the piston 132 to move the clutch 114 away from the driveline 116. Accordingly, the first and second pressure counteract each other.

During operation, and when the hydraulic pressure of the hydraulic fluid 105 from the power steering system 11 is high, the hydraulic pressure in the first compartment 134 generates a force acting on the piston 132 which is higher than the force exerted by the biasing member 118 on the first clutch member 114' of the clutch 114. Hereby, the first 114' and second 114" clutch members will not engage with each other and the auxiliary pump arrangement 100 will assume a disengaged state. Accordingly, in the disengaged state, the clutch is disconnected from the driveline 116 and the auxiliary pump 102 will not be operated to pressurize hydraulic fluid 105.

However, when for some reason, the hydraulic pressure of the hydraulic fluid 105 from the power steering system 11 is reduced, the hydraulic pressure in the first compartment 134 will be reduced and the force acting on the piston 132 will be lower compared to the force generated by the biasing member 118 on the first clutch member 114'. In such situation, the force acting on the first clutch member 114' will exceed the force acting on the piston 132 and the first clutch member 114' will move towards the second clutch member 114" to engage the clutch 114. The auxiliary pump arrangement 100 hereby assumes an engaged state in which the clutch 114 connects the auxiliary pump 102 to the driveline 116. The rotation of the driveline 116 will hereby be transmitted to the auxiliary pump 102 which will initiate a pumping action and start to pressurize the hydraulic fluid 105 directed into the pump inlet 104. The auxiliary pump 102 will thus feed pressurized hydraulic fluid to the power steering system 11 to enable the power steering system 11 to assist the steering operation for the driver of the vehicle 1.

By means of the hydraulic connection to the first compartment 134 and the biasing member 118, the power steering system 11 will automatically be provided with sufficient hydraulic pressure without the need of an operator having to intervene, or some other electrical control system needed to intervene. Also, since the auxiliary pump 102 is more or less only operated when needed, the overall fuel consumption of the vehicle is reduced, since the auxiliary pump is one of many inertias of the vehicle that would otherwise increase the fuel consumption.

Figure 3:
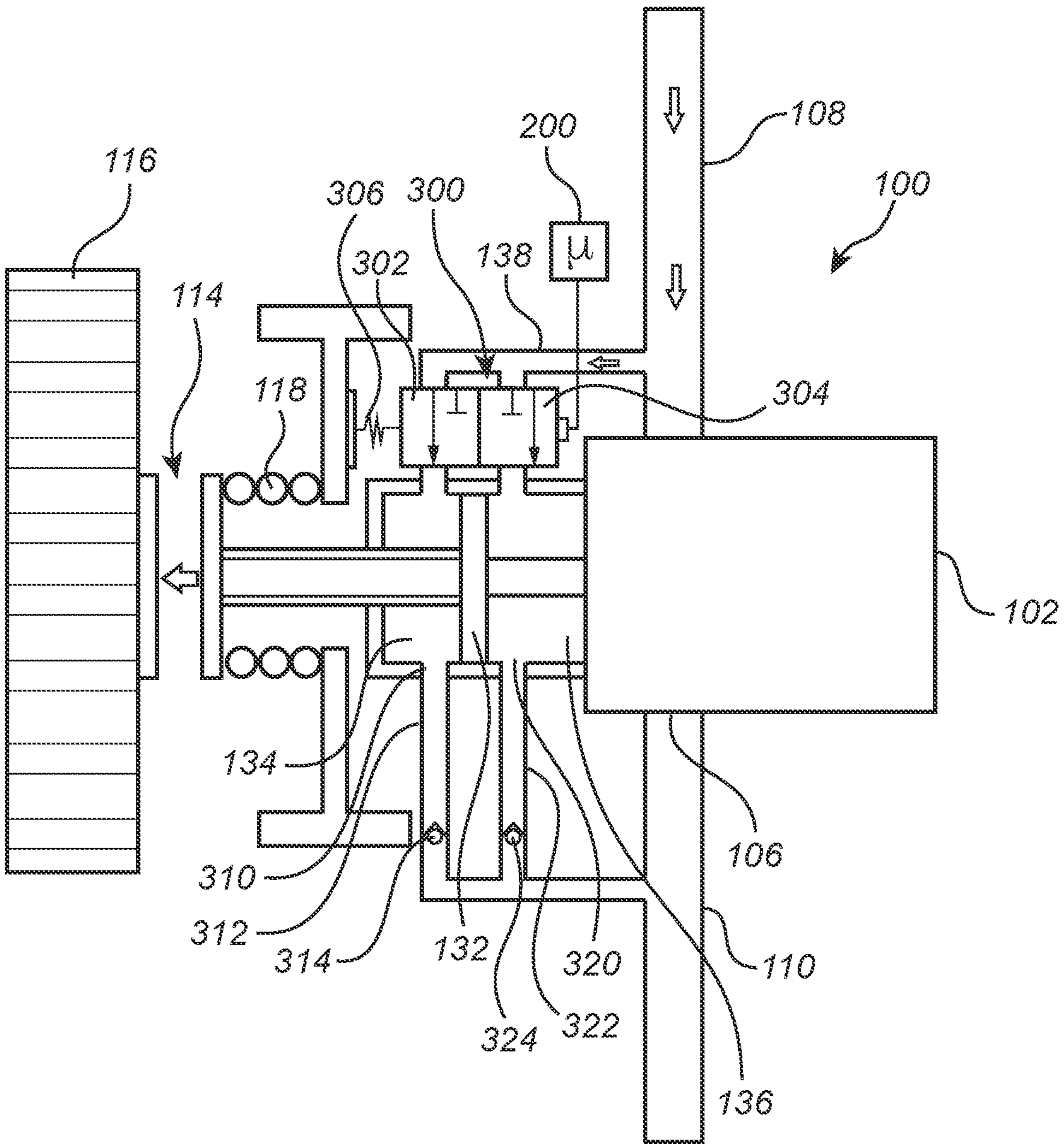
FIG. 3 is a schematic illustration of an auxiliary pump arrangement according to another example embodiment.

In order to describe the auxiliary pump arrangement according to another example embodiment, reference is now made to FIG. 3. It should be readily understood that the features described above in relation to FIG. 2 may also be included in the following example embodiment, even if these features are not explicitly described.

In addition to the above description in relation to FIG. 2, the auxiliary pump arrangement 100 also comprises a controllable valve 300. The controllable valve 300 is arranged in the chamber inlet conduit 138 and is configured to assume a first state in which the controllable valve 300 directs the flow of hydraulic fluid from the hydraulic supply conduit 108 to the first compartment 134 via a first valve member 302 of the controllable valve 300, and a second state in which the controllable valve 300 directs the flow of hydraulic fluid from the hydraulic supply conduit 108 to the second compartment 136 via a second valve member 304 of the controllable valve 300. Thus, when the controllable valve 300 assumes the first state, the hydraulic fluid is flowing as described above in relation to the example embodiment depicted in FIG. 2. The hydraulic fluid entering the first compartment 134 will thus exert a pressure on the piston 132 to urge the piston in a direction away from the driveline 116. When, on the other hand, the controllable valve 300 assumes the second state, the hydraulic fluid will be directed into the second compartment 136. The hydraulic fluid will hereby exert a pressure on the piston 132 in the opposite direction compared to when the controllable valve 300 assumes the first state, and the hydraulic fluid will instead assist the biasing member 118 to urge the clutch 114 towards the driveline 116.

As can be seen in FIG. 3, the controllable valve 300 is connected to, and controlled by, the above described control unit 200. Thus, the processing circuitry of the control unit 200 is configured to control the controllable valve 300 to assume the first and second states, i.e. to switch between the first and second states. As is exemplified in FIG. 3, the controllable valve 300 comprises a spring 306 which is arranged to exert a pressure on the controllable valve 300 such that the controllable valve 300 is pre-set to assume the first state. Hence, when no control signal is transmitted from the processing circuitry to the controllable valve 300, hydraulic fluid is flowing into the first compartment 134. The controllable valve 300 is thus, upon receipt of a control signal from the processing circuitry controlled to assume the second state. It should be readily understood that other means than the spring may be used for controlling the controllable valve to be pre-set to assume the first state. For example, the controllable valve may be purely controlled by the processing circuitry in which the controllable valve 300 assumes the first state upon omission of a control signal.

Furthermore, the first compartment 134 comprises a first outlet 310. The first outlet 310 is arranged in fluid communication with the pump outlet 106 of the auxiliary pump 102. In further detail, the first outlet 310 is connected to the pump outlet conduit 110 at a position downstream the pump outlet 106 via a first outlet conduit 312. Further, a first one-way valve 314 is arranged in fluid communication between the first outlet 310 and the pump outlet 106. In detail, and as exemplified in FIG. 3, the first one-way valve 314 is arranged in the first outlet conduit 312 and is configured to prevent hydraulic fluid from the pump outlet 106 to reach the first outlet 310, i.e. prevent hydraulic fluid from the pump outlet 106 to reach the first compartment 134.

Still further, the second compartment 136 comprises a second outlet 320. The second outlet 320 is arranged in fluid communication with the pump outlet 106 of the auxiliary pump 102. In further detail, the second outlet 320 is connected to the pump outlet conduit 110 at a position downstream the pump outlet 106 via a second outlet conduit 322. Hence, the first 312 and second 322 outlet conduits connects to each other at a position upstream the connection to the pump outlet conduit 110. Further, a second one-way valve 324 is arranged in fluid communication between the second outlet 320 and the pump outlet 106. In detail, and as exemplified in FIG. 3, the second one-way valve 324 is arranged in the second outlet conduit 322 and is configured to prevent hydraulic fluid from the pump outlet 106 to reach the second outlet 320, i.e. prevent hydraulic fluid from the pump outlet 106 to reach the second compartment 136.

Figure 4:
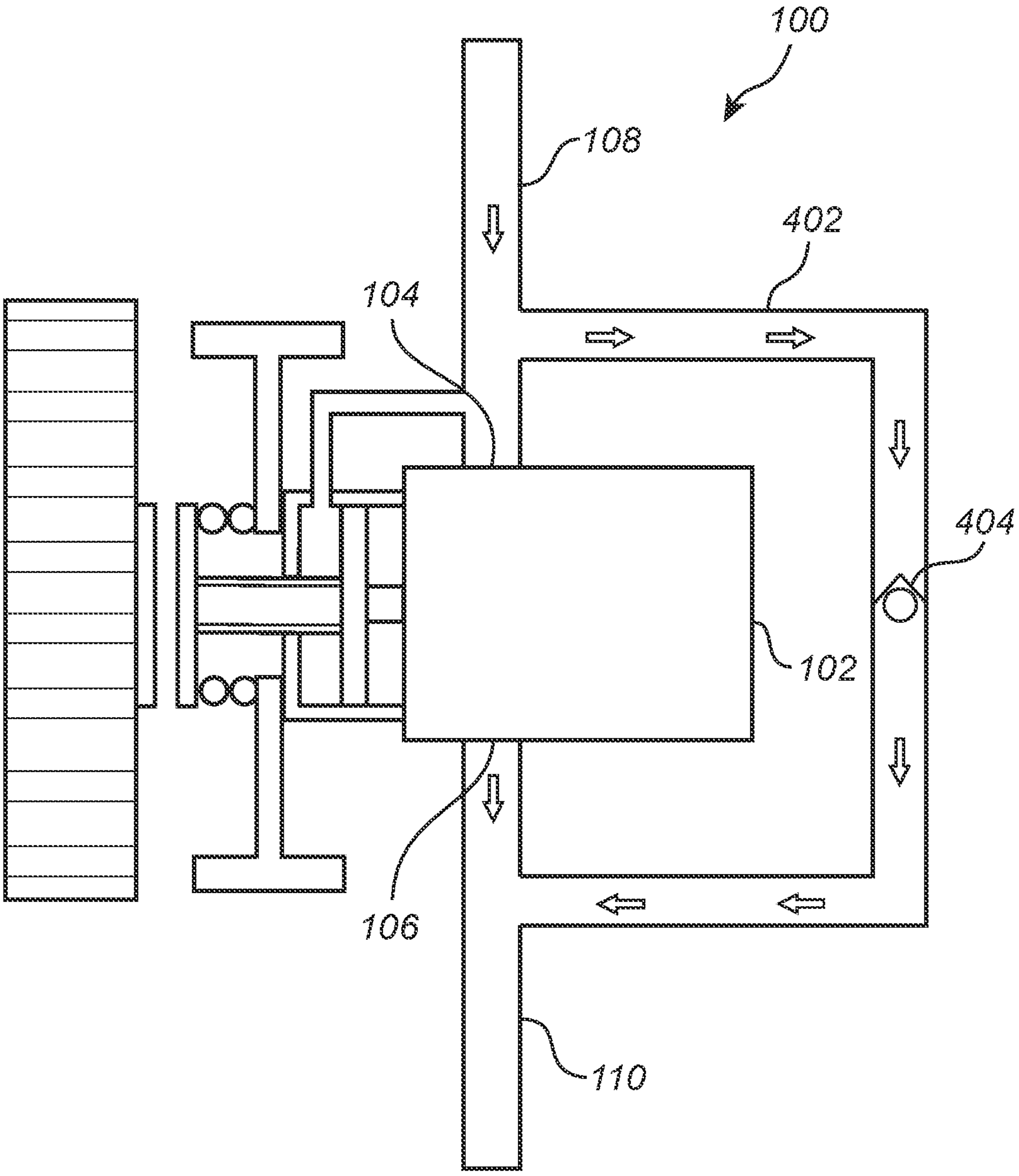
FIG. 4 is a schematic illustration of an auxiliary pump arrangement according to yet another example embodiment.

In order to describe the auxiliary pump arrangement according to a still further example embodiment, reference is now made to FIG. 4. It should be readily understood that the features described above in relation to FIGS. 2 and 3 may also be included and combined with the features described in the following example embodiment, even if these features are not explicitly described.

As can be seen in FIG. 4, the auxiliary pump arrangement further comprises a bypass conduit 402. The bypass conduit 402 is connected to the hydraulic supply conduit 108 and is configured to at least partly direct a flow of hydraulic fluid to bypass the auxiliary pump 102. In particular, the bypass conduit 402 is connected to the hydraulic supply conduit 108 at a position upstream the pump inlet 104 and connected to the pump outlet conduit 110 downstream the pump outlet 106. Moreover, the bypass conduit 402 also comprises a bypass one-way valve 404. The bypass one-way valve 404 can thus be designed to bypass the flow of hydraulic fluid when the pressure level of the hydraulic fluid exceeds a predetermined bypass threshold limit. Thus, the bypass one-way valve can be designed to be kept in the closed position until the hydraulic pressure in the hydraulic supply conduit 108 reaches the predetermined bypass threshold limit.

It is to be understood that the present disclosure is not limited to the embodiments described above and illustrated in the drawings; rather, the skilled person will recognize that many changes and modifications may be made within the scope of the appended claims.

The invention claimed is:

1. An auxiliary pump arrangement for providing a flow of hydraulic fluid to a power steering system of a vehicle, the auxiliary pump arrangement comprising:

an auxiliary pump having a pump inlet configured to receive a flow of hydraulic fluid from a primary power steering pump via a hydraulic supply conduit, and a pump outlet;

an actuator connected to the auxiliary pump, the actuator comprising a clutch connectable to a driveline of the vehicle;

a biasing member operable to exert a first pressure on the clutch for urging the clutch towards the driveline;

a chamber accommodating a piston member of the actuator, the piston member dividing the chamber into a first compartment and a second compartment, wherein the first compartment is configured to receive at least a portion of the flow of hydraulic fluid from the hydraulic supply conduit for exerting a second pressure on the piston member to urge the clutch away from the driveline, the first compartment comprising a first outlet, the first outlet being arranged in fluid communication with the pump outlet of the auxiliary pump; and a first one-way valve in fluid communication between the first outlet and the pump outlet, the first one-way valve being configured to prevent hydraulic fluid from the pump outlet to reach the first outlet;

wherein the auxiliary pump arrangement is configured to assume an engaged state in which the clutch connects the auxiliary pump to the driveline when the first pressure exceeds the second pressure, and a disengaged state in which the clutch disconnects the auxiliary pump from the driveline when the second pressure exceeds the first pressure.

2. The auxiliary pump arrangement according to claim 1, wherein the auxiliary pump arrangement comprises a controllable valve configured to assume a first state in which the controllable valve directs the flow of hydraulic fluid from the hydraulic supply conduit to the first compartment, and a second state in which the controllable valve directs the flow of hydraulic fluid from the hydraulic supply conduit to the second compartment.

3. The auxiliary pump arrangement according to claim 2, wherein the hydraulic fluid assists the biasing member to urge the clutch towards the driveline when the controllable valve assumes the second state.

4. The auxiliary pump arrangement according to claim 2, wherein the auxiliary pump arrangement further comprises a control unit, the control unit comprising processing circuitry coupled to the controllable valve, wherein the processing circuitry is configured to control the controllable valve to switch between the first and second states.

5. The auxiliary pump arrangement according to claim 4, wherein the controllable valve is pre-set to assume the first state and configured to assume the second state upon receipt of a control signal from the processing circuitry.

6. The auxiliary pump arrangement according to claim 2, wherein the controllable valve comprises a spring, the spring being configured to force the controllable valve to assume the first state.

7. The auxiliary pump arrangement according to claim 1, wherein the second compartment comprises a second outlet, the second outlet is arranged in fluid communication with the pump outlet of the auxiliary pump.

8. The auxiliary pump arrangement according to claim 7, further comprising a second one-way valve in fluid communication between the second outlet and the pump outlet, the second one-way valve being configured to prevent hydraulic fluid from the pump outlet to reach the second outlet.

9. The auxiliary pump arrangement according to claim 1, wherein the auxiliary pump arrangement further comprises a bypass conduit connected to the hydraulic supply conduit, the bypass conduit being configured to at least partly direct a flow of hydraulic fluid to bypass the auxiliary pump.

10. The auxiliary pump arrangement according to claim 9, wherein the bypass conduit comprises a bypass one-way valve.

11. A power steering system for a vehicle, the power steering system comprising a primary power steering pump operable by a prime mover of the vehicle, and the auxiliary pump arrangement according to claim 1.

12. A vehicle comprising the power steering system according to claim 11.

13. The vehicle according to claim 12, wherein the driveline comprises an electric machine for propelling at least one pair of wheels of the vehicle.

* * * * *